June 21, 1960  G. H. HILGARTNER, JR., ET AL  2,941,667
LEAF TOBACCO SEPARATOR AND METHOD
Filed April 16, 1957  4 Sheets-Sheet 1
FIG. 1
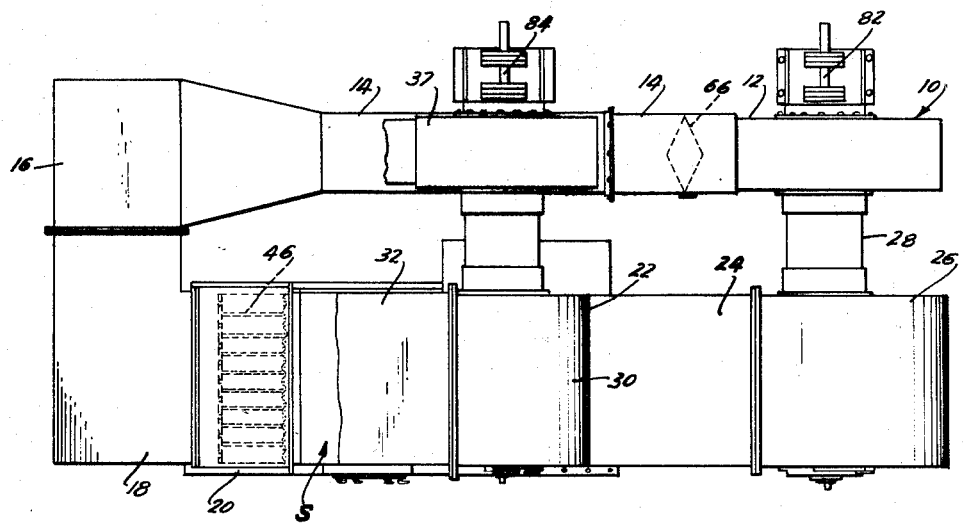
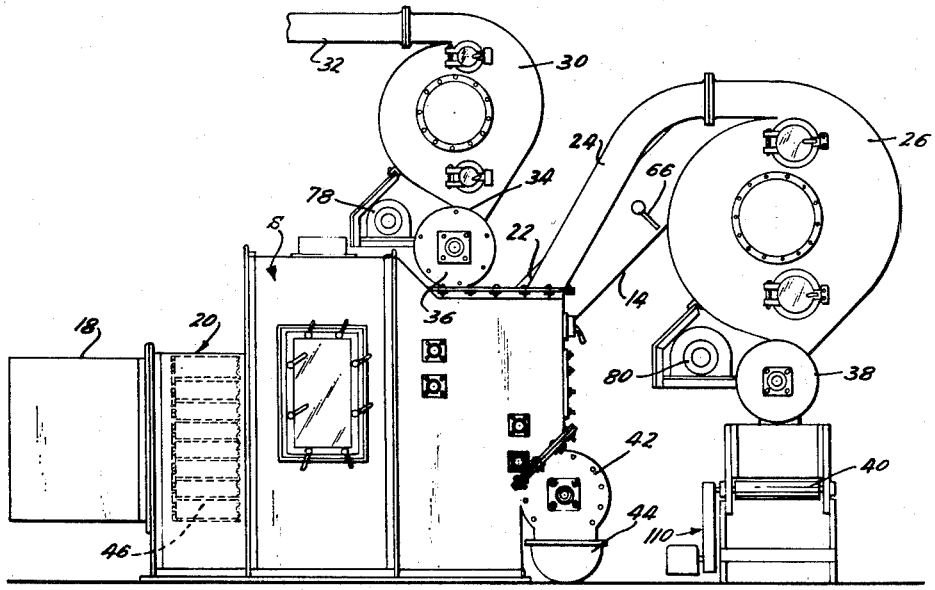
FIG. 2
INVENTOR.
GEORGE H. HILGARTNER JR.
MARTIN W. SEVERANCE
ATTORNEY June 21, 1960    G. H. HILGARTNER, JR., ET AL    2,941,667
LEAF TOBACCO SEPARATOR AND METHOD
Filed April 16, 1957                                4 Sheets-Sheet 2

INVENTOR.
GEORGE H. HILGARTNER JR.
MARTIN W. SEVERANCE
BY
ATTORNEY

June 21, 1960  G. H. HILGARTNER, JR., ET AL  2,941,667
LEAF TOBACCO SEPARATOR AND METHOD Filed April 16, 1957  4 Sheets-Sheet 3

INVENTOR.
GEORGE H. HILGARTNER JR.
MARTIN W. SEVERANCE
BY
ATTORNEY

INVENTORS.
GEORGE H. HILGARTNER JR.
MARTIN W. SEVERANCE
BY
*James K. Franklin*
ATTORNEY United States Patent Office 2,941,667
Patented June 21, 1960

2,941,667

LEAF TOBACCO SEPARATOR AND METHOD

George H. Hilgartner, Jr., and Martin W. Severance, Louisville, Ky., assignors to Brown & Williamson Tobacco Corporation, Louisville, Ky., a corporation of Delaware Filed Apr. 16, 1957, Ser. No. 653,160

20 Claims. (Cl. 209—134)

This invention relates to a separator and a separator method for use in a leaf tobacco threshing and separating line.

A leaf tobacco threshing and separating line consists of a line or sequence of threshers and separators arranged to produce a number of and as many as five successive threshing and separating operations. The thresher of each operation acts to strip leaf lamina from the stem, producing a product that is a mixture of lamina free from the stem and lamina still attached to the stem, and the separators of each operation act to physically separate the free lamina from the stem-attached-lamina. In a threshing and separating line, a series of separators operating in tandem and arranged to succeed or follow a thresher is used for effective separation of all of the stripped lamina; and the stem-attached-lamina coming from the last separator of a series is fed to the succeeding thresher for the next threshing and separating operation.

It is essential in each separating step of the process to remove from the tobacco mixture all of the free or loose lamina, since any loose lamina sent to and acted upon by a succeeding thresher is undesirably fragmentated thereby. To keep breakage or fragmentation of the already loosened lamina to a minimum, a series of separators, and as many as from three to five depending upon their position in the line, are used after a threshing operation. But even when a series of such separators is used, complete separation of the loose lamina is not accomplished.

Separators in common use are constructed and operate on the principle of passing the tobacco mixture into or through a current or blast of air, the air flow functioning to separate the light loose lamina product from the heavy stem-attached-lamina product and moving these to different discharge outlets. We have found that these prior art separators possess a common fault which make them inefficient for separation particularly when used on the larger size products. In these separators, the tobacco mixture is dropped into the high velocity end of a rapidly expanding air stream, resulting in a tendency to blow some of the light and heavy product together rather than to blow them apart. When the mixture is dropped into the high speed air stream, the light material more quickly assumes the air velocity, thus tending to move ahead of and be separated from the heavy material. However, as the air expands and its velocity is consequently slowed down, again the light material more quickly assumes the air velocity and thus slows down faster than the heavy material, with the result that some of the heavy product is impelled against the light loose lamina, entrapping the same and becoming entangled therewith. This not only inhibits the complete separation of the lamina from the lamina-attached stems but produces a tendency to the production of lumps in the mixture. This tendency to lumping increases in progression in the line particularly when the load on the line is heavy with a capacity such as 10,000 pounds of product per hour. This lumping tendency also results in frequent clogging of the line requiring stoppages of the line and interference with production.

The prime object of our present invention centers about the provision of a separator and a separating method in which there is obtained as near perfect a separation of the loose lamina from the lamina-attached-stem as possible, thus keeping breakage or fragmentation of loose lamina to a minimum and also obviating the above recited faults and defects inherent in separators of the prior art.

We have found that as few as two separators built to embody the principles of our present invention may be used to replace as many as five separators of the Air Leg type now used in a threshing and separating line; and the economy thereby effected (the thresher and separator process requiring considerable horsepower and floor space) is a further prime object of our invention.

For a thresher to strip lamina from the stem in the most efficient manner, the moisture content and temperature of the tobacco must be controlled to an ideal degree. It is, therefore, a further object of our invention to provide an improved separator operating also in a closed system whereby the products may be separated with a minimum change in temperature and moisture content of the product and one in which these factors are able to be controlled.

It is a still further object of our invention to produce a separator which is simple to operate and adjust and yet be flexible in its operation to take care of varying types and grades of leaf tobacco.

To the accomplishment of the foregoing objects and such other objects as may hereinafter appear, the present invention relates to the separator and separator method as sought to be defined in the appended claims taken together with the following specification and accompanying drawings in which:

Fig. 1 is a plan view of the leaf tobacco separator of the present invention shown installed in a closed circuit system;

Fig. 2 is an elevation thereof;

Figures 3, 3A:
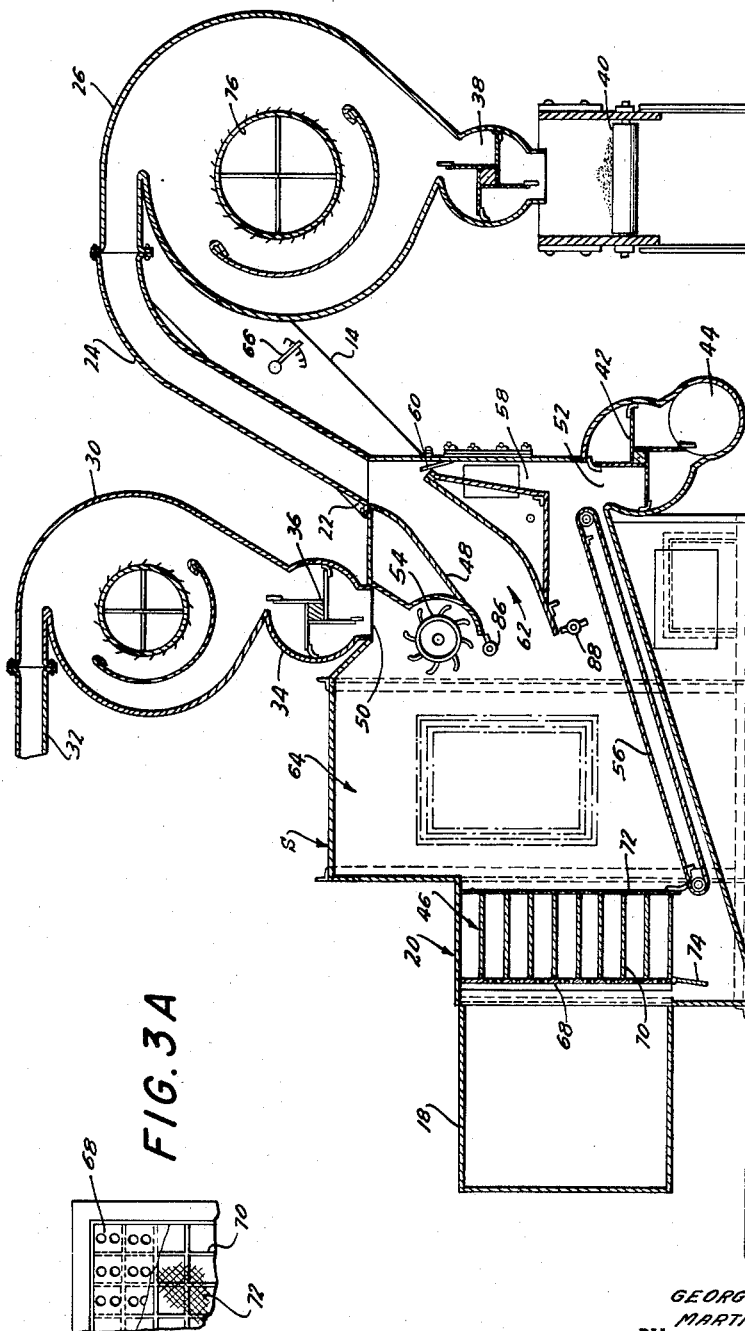
Fig. 3 is an elevational view of the apparatus of Fig. 2 shown on an enlarged scale and taken in diagrammatic vertical cross section so as to disclose the internal structure of the apparatus.
Fig. 3A is a view of a detail with parts broken away.

Reference may first be had to Figs. 1 and 2 of the drawings for an overall view of the separator and its installation in a closed pneumatic circuit system. The separator generally designated as S is connected in a closed air circuit comprising a blower or exhauster 10 having its exhaust end 12 connected to a pressure duct 14 provided with an elbow 16 which leads into a pressure or plenum chamber 18 connected to the intake or entrant end 20 of the separator S, the output or exit end 22 of the separator S being connected to a suction duct 24 which leads to a tangential or cyclonic separator 26 the low pressure end of which is connected by means of a duct 28 to the exhauster or blower 10.

The apparatus shown in Figs. 1 and 2 for conveying the tobacco products through the separator further includes pneumatic means leading from either a previous separator or from a thresher for conveying the mixture of tobacco (a mixture of lamina free from the stem and lamina still attached to the stem) into the separator S, the same comprising a tangential or cyclonic separtor 30, the intake end 32 of which leads from a previous separator or from a thresher and the product end 34 of which leads into an air lock rotor 36 which in turn deposits the tobacco product mixture into the separator S for treatment therein. The air output end of the separator 30 connects to the blower 37. The light product, namely the lamina, isolated by the separator S after moving through the suction duct 24 and the cyclonic separator 26 deposits itself into an air lock rotor 38 from which it moves on to a conveyor 40 where this product may be inspected for collection. The heavy product, namely the stem-attached-lamina, moves from the separator S into an air lock rotor 42 and thence by means of a pneumatic duct 44 into a succeeding thresher or a succeeding separator in the line.

Referring now particularly to Fig. 3 of the drawings, the separator S comprises a closed chamber having at its air entrant end 20 a baffle and air straightener system 46 and provided at its air exit end 22 with an air suction duct 48 communicating with the suction duct 24, the said separator chamber being further provided with an opening 50 for the entrance of the product mixture (deposited by the air lock rotor 36) and an opening 52 which forms an outlet for the stem-attached-lamina (deposited into the air lock 42). The separator S is further provided with means for projecting or tossing the tobacco mixture feeding through the opening 50 into the separator chamber in a manner hereinafter described, the same comprising a rapidly rotating winnower 54; and the separator is also provided with a conveyor 56 located at its bottom for conveying the stem-attached-lamina which gravitates thereto towards the opening 52 and into the air lock 42. A secondary path for the separated lamina is also preferably provided by means of the passageway 58 which leads from the chamber into the suction duct 24, the same being controlled by a damper 60.

Figure 5:
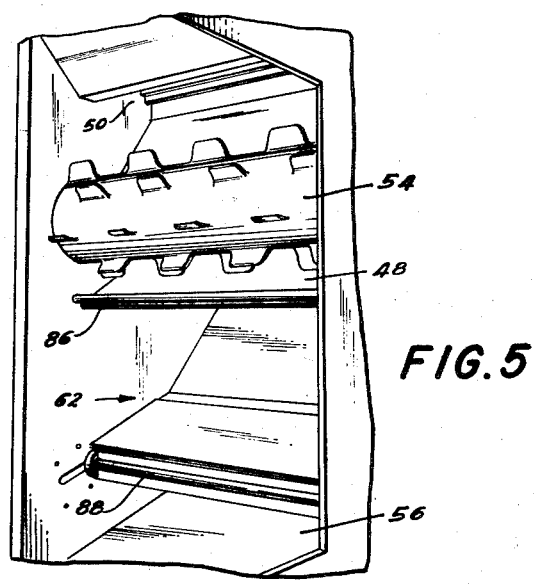
Fig. 5 is a perspective view of certain of the interior parts of the separator.

The separation chamber of the separator S is divided by the apparatus arrangement just described into an air entrant opening 20 at the pressure side thereof which extends for the whole width of the chamber as depicted in Fig. 1 and for the height of the entrant opening as clearly depicted in Fig. 3, an air exit opening towards the opposite side thereof which is defined by the mouth 62 of the suction duct 48, which mouth extends for the whole width of the chamber (as clearly shown in Fig. 5 of the drawings) and which extends for the height best indicated in Figs. 3 and 5, and a pocket 64 at the upper part of the separation chamber and lying above the air flow path between the entrant opening 20 and the exit opening or mouth 62. The area of the entrant opening 20 is substantially larger and is of the order of three times the area of the exit opening or mouth 62.

Figure 6A:
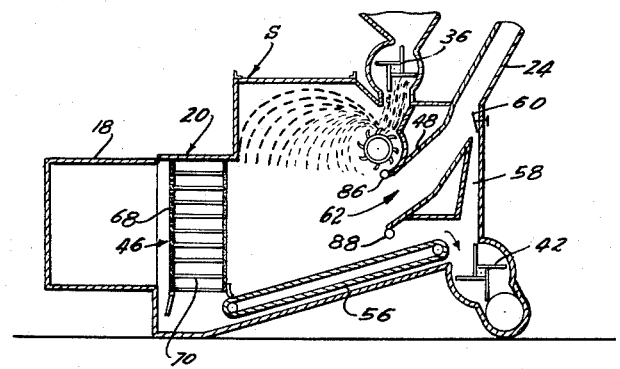
Figs. 6A to 6D are diagrammatic views explanatory of the principles involved in the method and apparatus of the separator.
Figure 6B:
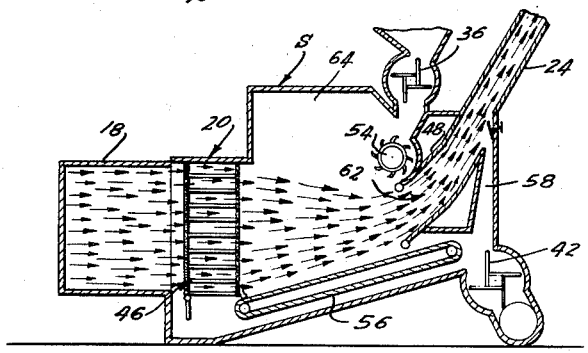
Figure 6C:
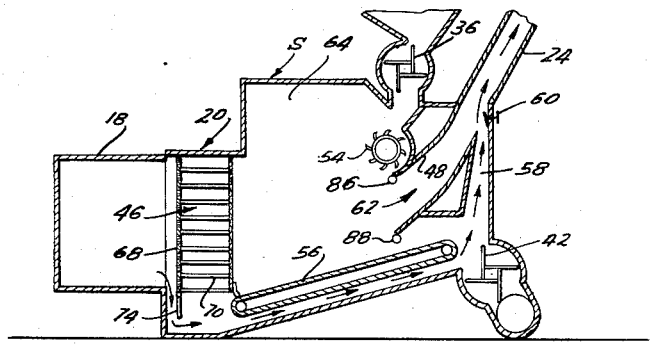
Figure 6D:
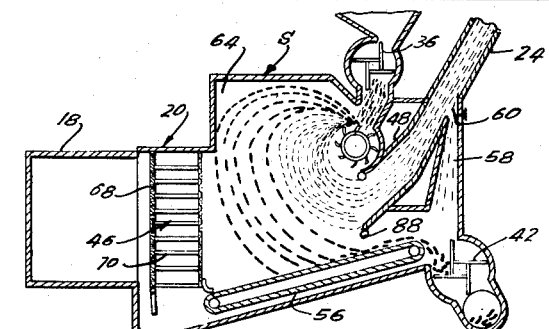

Figs. 6A to 6D depict diagrammatically and graphically the underlying principles of the separation method and the separator structure of the present invention. Fig. 6B depicts the nature and path of the air flow in the separation chamber resulting from the described structure; Fig. 6A depicts the manner in which the tobacco product mixture is injected or tossed into the separation chamber; Fig. 6C depicts the action of the secondary air separation; and Fig. 6D depicts the resultant effect of the forces pictured in Figs. 6A to 6C on the separation and movement of the lighter and the heavier particles in the tobacco mixture.

Referring first to Fig. 6B, in which the arrows depict the main air flow path, the entrant opening 20 being substantially larger in effective area than the exit opening or mouth 62, the air is flowed at an increasing velocity through the separation chamber from a relatively low velocity at the entrant opening 20 to a relatively high velocity at the exit opening 62. Fig. 6A depicts the effect of projecting a threshed tobacco mixture by means of the winnower 54 into the air pocket 64 of the separation chamber; the tobacco mixture (the heavier particles of which are indicated by the heavier lines and the lighter particles of which are indicated by the lighter lines) is tossed above the path of the air flow in a direction generally countercurrent thereto, the effect being to initially separate in said direction the heavy product from the light product, the said products thereupon moving by gravity into the air flow. Fig. 6D depicts the resultant effect of both of the forces just described; a combination of the effects described in connection with Figs. 6A and 6B being that the light product of the tobacco mixture moving into the air flow path is further separated from the heavy product in the direction of the air flow, the said products being thereby caused to move into two resulting generally separate travel paths, the light product being carried by the air flow into the exit opening 62 and the heavy product being gravitated to the bottom of the chamber where it is conveyed away by the conveyor 56 to the air lock rotor 42 for feeding into a succeeding thresher or a succeeding separator.

Operating upon these principles, when the product mixture falls to the winnower 54 the product is thrown upward into the relatively stationary air chamber or pocket 64. As the product travels through this stationary air pocket, the heavier part of the product which is stem-attached-lamina, travels farther than the light part of the mixture. Thus the product receives an initial separation action before it falls into the air path of the separation chamber. This is of considerable advantage in separating this type of product, where there is a tendency as in prior separators for the light product to be blown into and to become entangled in the heavier part of the product. This initial separation prevents light particles in transit through the separator having to cross the travel path of the heavy particles, thus eliminating considerable entangling. Entangling of the heavy and light parts of the product is a very important factor that in prior known apparatus prevents perfect separation. Another purpose of the winnower is to cause the product, as it falls into the separator chamber, to be scattered and without lumps. The product moves from the air pocket 64 towards and into the relatively low velocity end of the air stream. Since the air flows with an increasing velocity through the chamber, the light material (assuming more quickly than the heavier material the speed of the air stream) flows more progressively ahead of the heavier material. The stem-attached-lamina having been thrown by the winnower farther from the suction mouth than the lamina, and the lamina more quickly assuming the increasing air velocity that takes place, results in the further separation of the lamina from the stem-attached-lamina in the direction of the air flow, with the ultimate result that the stem-attached-lamina falls or gravitates to the conveyor 56 and the lamina particles are carried into the suction mouth and ducts 48 and 24 completely separated from the stem-attached-lamina. The velocity of the air across the separator chamber is controlled by a damper 66 in the pressure duct 14, see Fig. 1, the velocity being controlled to a speed that deflects the lamina without stem into the suction mouth 62.

It has been found desirable to have the air pass through the separator S in as straight lines as possible and to have the air that is flowed into said chamber at the entrant opening thereof at a cross-sectionally uniform velocity. The straight line air flow is desired to avoid twisting of the air as it moves through the separator chamber since such twisting tends to carry down the light materials and thereby interfere with the perfect separation. Uniform air flow at the entrant opening over the whole area thereof is highly desirable in order to get equal separation action at all areas or points across the separator. This uniform air speed is obtained by using a diffuser plate 68 at the entrant end of the separator thus making chamber 18 to act as a plenum chamber. This diffuser plate is a perforated plate as indicated in Fig. 3A of the drawings, the area of the perforations being about 50% of the area of the plate. This diffuser plate causes a resistance to the air flow, giving uniform air flow on the lower pressure side of the diffuser plate. The means for providing a linear movement of the air comprises the tubular duct system 70 (Figs. 3 and 3A) similar to air straighteners in general use where actual measurement is taken of air flow in ducts. The air straightener or tubular duct system 70 is covered by a screen 72 which functions to deflect any product from being thrown into the tubes of the air straightener.

To prevent any accumulation of small particles of tobacco under the conveyor 56 means is provided for establishing the secondary air flow 58 briefly referred to above. This air flow originates from the air pressure duct 18, i.e. from the high pressure side of the baffle plate 68 and may be controlled by means of the damper 60 heretofore referred to as well as by the damper 74 (see Fig. 6C). This flow of air, indicated by the arrows in Fig. 6C, picks up any accumulation of small particles of tobacco which find their way under the conveyor 56; and this air is also directed through any light material that may fall over the upper end of the conveyor, this flow of air acting to pick up such residual light material and carry it through the channel 58 to join the product moving through the suction ducts 48 and 24.

The cyclonic separators such as 26 and 30 are of a well known construction. These separators function for removing the conveyed material (the tobacco product) from the conveying air stream. A description of the cyclonic separator 26 will suffice for a description of the separator 30 as well. The air stream entraining the product material to be separated is introduced by suction into the upper portion of the casing of the separator 26 through a tangential inlet as shown in Fig. 3. The tangential forces imposed upon the solid particles will cause the same to be thrown to the perimeter of the tangential shell and be conveyed into the air lock 38. The conveying air continues to circulate at high speed around the louvered air screen 76 and in this manner assists further in the separation of the solid particles from the air; the clean air continues to be discharged through the louvered screen. The air lock is driven by a motor associated therewith, the air lock 36 being connected to electric motor 78 (see Fig. 2), and the air lock 38 being connected to be driven by an electric motor 80. The exhausters or blowers 10 and 27 are driven by separate electric motors (not shown), the rotors of the blowers being supported in a bearing system such as 82 for the blower 10 and 84 for the blower 27 (see Fig. 1).

Other operated parts within the separator S preferably include means for keeping the exit opening or suction mouth 62 clean of leaf from hanging on the edges of the suction opening. At the top of the suction opening there is therefore provided a rotatable shaft 86 with a doffer wing plate, the rotation of which keeps leaf from hanging on the top edge of the suction mouth 62; and at the bottom of the suction opening there is provided a shaft 88 formed with two doffer wings, the rotation of which keeps leaf from hanging on the bottom edge of the suction mouth (see particularly Figs. 3 and 5).

Figure 4:
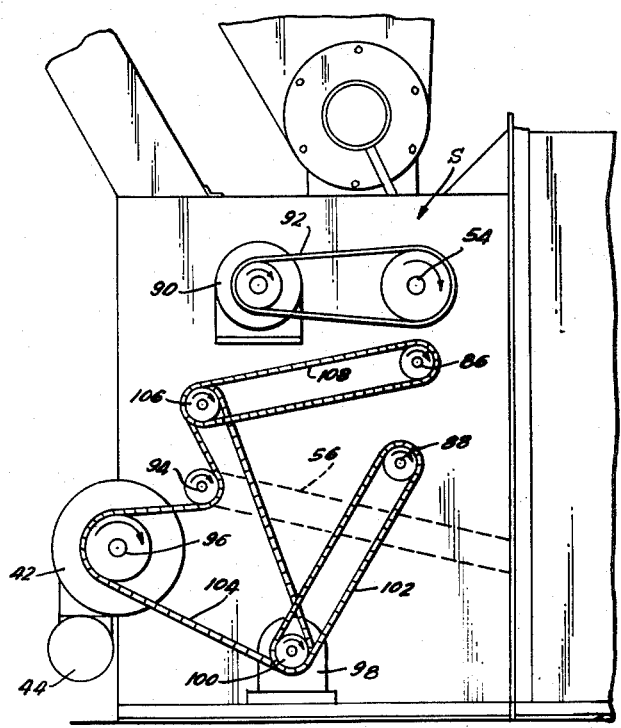
Fig. 4 is a rear elevational view of the separator depicting a number of the drive connections thereof.

The drives for the various moving parts of the separator S are shown in Fig. 4 of the drawings. The winnower 54 (indicated by its shaft in Fig. 4) is driven by a vari-drive motor 90 through a pulley and belt connection 92, the parts being rotated in the arrowed direction shown in Fig. 4, the winnower being driven by the variable speed motor at from 500 to 1000 r.p.m. Shaft 94 drives the belt conveyor 56. Shaft 96 drives the air lock rotor 42. The two doffer wing shafts 86 and 88 are so indicated in Fig. 4 and these rotate in the arrow indicated directions. Electric motor 98 through one part of a double sprocket 100 drives the shaft 88 through the sprocket chain 102, and through the other part of the double sprocket drives by way of the sprocket chain 104 the air lock rotor 42, the conveyor belt shaft 94 and a part of a double idler sprocket 106. The idler sprocket drives the shaft 86 by means of the sprocket chain 108, all parts being rotated in the arrow indicated directions. The conveyor 40 (see Fig. 2) is driven by a motor and belt connection 110.

The structure, operation, functioning and the advantages of the separator of the present invention and the underlying principles thereof will in the main be fully apparent from the above detailed description thereof. If will be further apparent that changes may be made in the various parts or sections thereof without departing from the principles of the invention as defined in the following claims.

We claim:

1. The method of separating the light loose lamina product from the heavy stem-attached-lamina product in a threshed tobacco mixture which consists in flowing air through and across a separation chamber at an increasing velocity from a relatively low velocity at an entrant opening of the chamber to a relatively high velocity at and through an exit opening of the chamber and moving the threshed tobacco mixture from above the path of said air flow into the path of the air flow at the low velocity region thereof, thereby separating the light product from the heavy product in the direction of said air flow, with the said products being caused to move into two generally separate travel paths in the chamber, the light product being carried by the air flow into and through the exit opening and the heavy product being gravitated to the bottom of the chamber.

2. The method of separating the light loose lamina product from the heavy stem-attached-lamina product in a threshed tobacco mixture which consists in flowing air through and across a separation chamber at an increasing velocity from a relatively low velocity at an entrant opening of the chamber to a relatively high velocity at and through an exit opening of the chamber and projecting the threshed tobacco mixture from above into said chamber above the path of said air flow in a direction countercurrent thereto thereby initially separating in said direction the heavy product from the light product, said products thereupon moving by gravity into the air flow path at the low velocity region thereof, the air flow thereby further separating the light product from the heavy product in the direction of said air flow, with the said products being caused thereby to move into two resulting generally separate travel paths in the chamber, the light product being carried by the air flow into and through the exit opening and the heavy product being gravitated to the bottom of the chamber.

3. The method of claim 2 in which the air is flowed into said chamber at the entrant opening thereof in a linear path.

4. The method of claim 1 in which the air is flowed into said chamber at the entrant opening thereof and at a cross-sectionally uniform velocity.

5. The method of separating the light loose lamina product from the heavy stem-attached-lamina product in a threshed tobacco mixture which consists in flowing air in a linear path through and across a separation chamber at an increasing velocity from a relatively low velocity at an entrant opening of the chamber to a relatively high velocity at and through an exit opening of the chamber and moving the threshed tobacco mixture from above the path of said air flow into the path of the air flow at the low velocity region thereof, thereby separating the light product from the heavy product in the direction of said air flow, with the said products being caused to move into two generally separate travel paths in the chamber, the light product being carried by the air flow into and through the exit opening and the heavy product being gravitated to the bottom of the chamber.

6. The method of claim 5 in which the air is flowed into said chamber at the entrant opening thereof at a cross-sectionally uniform velocity.

7. A separator for separating the light loose lamina product from the heavy stem-attached-lamina product in a threshed tobacco mixture comprising, a separation chamber provided with an air entrant opening at one side thereof, an air exit opening toward the opposite side thereof, means for flowing air through said chamber from the entrant opening to and through the exit opening, the entrant opening being substantially larger in effective area than the exit opening whereby the air is flowed at an increasing velocity through said chamber from a relatively low velocity at the entrant opening to a relatively high velocity at said exit opening, and means positioned above and between said entrant and exit openings to introduce the tobacco mixture into said chamber from above the air flow into said air flow and at a region toward said entrant opening, the light product of said tobacco mixture introduced into the chamber being thereby separated from the heavy product in the direction of said air flow, with the said products being caused to move into two generally separate travel paths, the light product being carried by the air flow into and through the exit opening and the heavy product being gravitated to the bottom of the chamber.

8. A separator for separating the light loose lamina product from the heavy stem-attached-lamina product in a threshed tobacco mixture comprising, a separation chamber provided with an air entrant opening at one side thereof, an air exit opening toward the opposite side thereof, means for flowing air in a linear path into said entrant opening, the air moving thence through said chamber and through the exit opening, the entrant opening being substantially larger in effective area than the exit opening whereby the air is flowed at an increasing velocity through said chamber from a relatively low velocity at the entrant opening to a relatively high velocity at said exit opening, and means positioned above and between said entrant and exit openings to introduce the tobacco mixture into said chamber from above the air flow into said air flow and at a region toward said entrant opening, the light product of said tobacco mixture introduced into the chamber being thereby separated from the heavy product in the direction of said air flow, with the said products being caused to move into two generally separate travel paths, the light product being carried by the air flow into and through the exit opening and the heavy product being gravitated to the bottom of the chamber.

9. A separator for separating the light loose lamina product from the heavy stem-attached-lamina product in a threshed tobacco mixture comprising, a separation chamber provided with an air entrant opening at one side thereof, an air exit opening toward the opposite side thereof, means for flowing air at a cross-sectionally uniform velocity into said entrant opening, the air moving thence through said chamber to and through the exit opening, the entrant opening being substantially larger in effective area than the exit opening whereby the air is flowed at an increasing velocity through said chamber from a relatively low velocity at the entrant opening to a relatively high velocity at said exit opening, and means positioned above and between said entrant and exit openings to introduce the tobacco mixture into said chamber from above the air flow into said air flow and at a region toward said entrant opening, the light product of said tobacco mixture introduced into the chamber being thereby separated from the heavy product in the direction of said air flow, with the said products being caused to move into two generally separate travel paths, the light product being carried by the air flow into and through the exit opening and the heavy product being gravitated to the bottom of the chamber.

10. The separator of claim 7 in which means is provided at the bottom of the chamber for continuously removing the heavy product gravitated thereto.

11. The separator of claim 7 in which the separation chamber forms part of a closed air flow system.

12. A separator for separating the light loose lamina product from the heavy stem-attached-lamina product in a threshed tobacco mixture comprising, a separation chamber provided with an air entrant opening at one side thereof and an air exit opening toward the opposite side thereof, means for flowing air through said chamber from the entrant opening to the exit opening, mechanism for projecting a threshed tobacco mixture into said chamber above the path of the air flow in a direction countercurrent thereto thereby initially separating in said direction the heavy product from the light product, said products thereupon moving by gravity into the air flow, the said entrant opening being substantially larger in effective area than the said exit opening whereby the air is flowed at an increasing velocity through said chamber from a relatively low velocity at the entrant opening to a relatively high velocity at and through said exit opening, whereby the light product of said tobacco mixture moving into the air flow path is further separated from the heavy product in the direction of said air flow, with the said products being caused to move into two resulting generally separate travel paths, the light product being carried by the air flow into and through the exit opening and the heavy product being gravitated to the bottom of the chamber.

13. The separator of claim 12 in which the separation chamber is provided with an air pocket above the air flow path, and in which the said mechanism is located in the chamber so as to project the threshed tobacco mixture into said air pocket.

14. The separator of claim 12 in which the means for flowing air through the chamber includes means for flowing air in a linear path into the said entrant opening of the chamber.

15. The separator of claim 12 in which the means for flowing air through the chamber includes means for flowing the air at a cross-sectionally uniform velocity into said entrant opening of the chamber, the air moving thence through the chamber to the exit opening thereof.

16. A separator for separating the light loose lamina product from the heavy stem-attached-lamina product in a threshed tobacco mixture comprising, a separation chamber provided with an air entrant opening at one side thereof, an air pressure duct leading thereto, an air exit opening toward the opposite side thereof, an air suction duct leading therefrom and means to introduce the tobacco mixture into said chamber above and between said openings and at a region near said entrant opening, means for flowing air through the air pressure duct, the entrant opening, the chamber, the exit opening and the air suction duct, the entrant opening being substantially larger in effective area than the exit opening whereby the air is flowed at an increasing velocity through said chamber from a relatively low velocity at the entrant opening to a relatively high velocity at said exit opening, the light product of said tobacco mixture introduced into the chamber being thereby separated from the heavy product in the direction of said air flow, with the said products being caused to move into two generally separate travel paths, the light product being carried by the air flow into the exit opening and the air suction duct and the heavy product being gravitated to the bottom of the chamber, a conveyor at the bottom of the chamber for continuously removing the heavy product from the chamber, and means establishing a secondary air flow from the air pressure duct to the air suction duct along the path of said conveyor.

17. A separator for separating the light loose lamina product from the heavy stem-attached-lamina product in a threshed tobacco mixture comprising, a separation chamber provided with an air entrant opening including a baffle plate at one side thereof, an air pressure duct leading thereto, an air exit opening toward the opposite side thereof, an air suction duct leading therefrom and further provided with means to introduce the tobacco mixture into said chamber above and between said openings and at a region toward said entrant opening, means for flowing air through the air pressure duct, the entrant opening, the chamber, the exit opening and the air suction duct, the entrant opening being substantially larger in effective area than the exit opening whereby the air is flowed at an increasing velocity through said chamber from a relatively low velocity at the entrant opening to a relatively high velocity at said exit opening, the light product of said tobacco mixture introduced into the chamber being thereby separated from the heavy product in the direction of said air flow, with the said products being caused to move into two generally separate travel paths, the light product being carried by the air flow into the exit opening and the air suction duct and the heavy product being gravitated to the bottom of the chamber, a conveyor at the bottom of the chamber for continuously removing the heavy product from the chamber, and means establishing a secondary air flow from the air pressure duct at the high pressure side of said baffle plate to the air suction duct along the path of said conveyor.

18. A separator for separating the light loose lamina product from the heavy stem-attached-lamina product in a threshed tobacco mixture comprising, a separation chamber provided with an air entrant opening at one side thereof, an air pressure duct leading thereto, an air exit opening toward the opposite side thereof, an air suction duct leading therefrom, and also provided with means to introduce the tobacco mixture into said chamber above and between said openings and at a region toward said entrant opening, means for flowing air through the air pressure duct, the entrant opening, the chamber, the exit opening and the air suction duct, the light product of said tobacco mixture introduced into the chamber being separated from the heavy product in the direction of said air flow, the light product being carried by the air flow into the exit opening and the air suction duct and the heavy product being gravitated to the bottom of the chamber, a conveyor at the bottom of the chamber for continuously removing the heavy product from the chamber, and means establishing a secondary air flow from the air pressure duct to the air suction duct along the path of said conveyor.

19. The separator of claim 18 in which the air entrant opening includes a baffle plate and an air straightener and in which the means for establishing the secondary air flow comprises a communication from the pressure side of the baffle plate to the air suction duct via the chamber along the path of the conveyor.

20. A separator for separating the light loose lamina product from the heavy stem-attached-lamina product in a threshed tobacco mixture comprising, a separation chamber provided with an air entrant opening at one side thereof, an air pressure duct leading thereto, an air exit opening toward the opposite side thereof, an air suction duct leading therefrom and also provided with means for projecting a threshed tobacco mixture into said chamber above and between said openings and in a direction towards the entrant opening, means for flowing air through the air pressure duct, the entrant opening, the chamber, exit opening and the air suction duct, the light product of said tobacco mixture projected into the chamber being thereby separated from the heavy product, with the said products being caused to move into two generally separate travel paths, the light product being carried by the air flow into the exit opening and the air suction duct and the heavy product being gravitated to the bottom of the chamber and a conveyor at the bottom of the chamber for continuously removing the heavy product from the chamber.

References Cited in the file of this patent

UNITED STATES PATENTS

| | | |
|---|---|---|
| 555,533 | Randolph | Mar. 3, 1896 |
| 736,862 | Moe | Aug. 18, 1903 |
| 775,965 | Edison | Nov. 29, 1904 |
| 844,620 | Saunders | Feb. 19, 1907 |
| 1,720,861 | Stebbins | July 16, 1929 |
| 1,863,666 | Lorentz | June 21, 1932 |
| 2,130,880 | Durning | Sept. 20, 1938 |
| 2,132,961 | Morgan | Oct. 11, 1938 |
| 2,210,103 | Stoner | Aug. 6, 1940 |

FOREIGN PATENTS

| | | |
|---|---|---|
| 1,277 | Great Britain | 1864 |
| 7,880 | Great Britain | 1901 |
| 60,179 | Germany | Dec. 10, 1891 |